2,982,619

METALLIC COMPOUNDS FOR USE IN HIGH-TEMPERATURE APPLICATIONS

Roger A. Long, Bay Village, Ohio
(1782 Knoxville St., San Diego, Calif.)

No Drawing. Continuation of application Ser. No. 177,548, Aug. 3, 1950. This application Apr. 12, 1957, Ser. No. 652,358

8 Claims. (Cl. 23—204)

(Granted under Title 35, U.S. Code (1952), sec. 266)

This invention relates to metallic compounds which are characterized by a relatively high melting point, i.e. relatively high refractoriness, and by resistance to oxidation and abrasion at elevated temperatures. In particular the invention relates to inter-metallic compounds of silicon with certain metals of the fourth and sixth groups of the periodic table of the elements. More specifically the invention relates to an inter-metallic compound of molybdenum di-silicide and to its properties and uses.

The general object of the invention is to produce an inter-metallic compound or an intermediate solid solution of silicon and a metal selected from the group consisting of uranium, molybdenum, chromium, tungsten, zirconium, and titanium by a novel method of heat treatment.

It is a further object of the invention to produce an inter-metallic compound of silicon with one of the above defined metals which is relatively refractory and resistant to abrasion at high temperatures.

It is a particular object of the invention to produce an inter-metallic compound of silicon and molybdenum in which these components are combined in the stoichiometric proportions of molybdenum di-silicide ($MoSi_2$).

It is an additional object of the invention to produce a di-silicide of molybdenum which by methods of powder metallurgy may be molded and shaped into products that are resistant to oxidation, are of accurate dimensions and relatively high mechanical strength.

An object also is to provide a composition formed by a mixture of a di-silicide of a metal selected from the group consisting of uranium, molybdenum, chromium, tungsten, zirconium, and titanium, with other metals, semi-metals, oxides, carbides, borides or other silicides.

An additional object of the invention is to produce a compound of silicon having high corrosion and wear-resistant properties.

Prior scientific and patent literature contains various suggestions for the production of molybdenum disilicide. However as far as the inventor is aware, there was not available up to the present time a simple process for producing molybdenum disilicide of relatively high purity in a form in which it could be readily comminuted into fine particles for use in producing by powder-metallurgy technique shaped cemented bodies of great hot strength and corrosion resistance.

The present invention is based on the discovery that, when a stoichiometrically proportioned intimate mixture of fine particles of molybdenum and silicon, corresponding to the formula $MoSi_2$, is heated to an elevated temperature of about 2000° F., which is well below the melting point of these components, a reaction takes place between them which results in the production of relatively pure molybdenum disilicide in a friable form which may be readily comminuted into fine powder particles suitable for powder metallurgy processing. The reaction of the silicon with the molybdenum is exothermic and the temperature rises to about 3000° F. The silicon reacts with the molybdenum throughout the mass and forms a new lattice structure. This is shown by X-ray diffraction tests which show the disilicide pattern present, and silica. When the reaction is run in a vacuum or a reducing or inert atmosphere, the excess silicon appears as silicon and not as silica.

This inventor has produced the molybdenum disilicide in powdered form for use in molding various articles by the different methods of powder metallurgy. He obtained the disilicide in powdered form by mixing one equivalent of powdered molybdenum with two mols equivalents of powdered silicon (325 mesh size), thoroughly mixing this mixture as in a ball mill, removing the mixture from the ball mill and heating the stoichiometrically proportioned fine mixture in air, vacuum or inert gas atmosphere until an exothermic reaction occurred. A suitable vessel of refractory material, such as a crucible or boat of alundum, beryllia, etc., may be used for holding the powder mixture which is produced in the furnace. This reaction took place at about 1900° F.±100° F. with a subsequent temperature rise to about 3000° F. The powder was then crushed, ball-milled and leached with concentrated nitric acid to remove any unreacted molybdenum metal and with hot hydrochloric acid to remove any molybdenum oxide. Leaching is not necessary when reacting in a vacuum or gas atmosphere. It was found that the silicon volatilized at the reaction temperature under a vacuum; that it was necessary to carry the reaction to completion in a partial pressure atmosphere of argon or helium when such gas was introduced into the vacuum to furnish up to one half to three quarters atmospheric pressure.

The molybdenum disilicide produced by this method was not fused; it was friable and was readily ground to a desired fineness by ball-milling or other particle reducing methods. This grinding will be described hereinafter.

It was also discovered that a mass of high-purity powder of molybdenum disilicide ($MoSi_2$), fine particles, without addition of any generally used binder substances, such as, cobalt, nickel, or the like, will when compacted under pressure and heat by known powder metallurgical techniques yield a cemented body of substantially pure molybdenum disilicide ($MoSi_2$) exhibiting extremely desirable hot, physical and mechanical properties, which combined with its superior corrosion resistance makes it ideal for applications such as gas-turbine buckets, flame holders and the like.

This inventor produced the disilicides of metals other than molybdenum by this direct reaction method. In particular he produced the disilicides of uranium, chromium, tungsten, zirconium, and titanium. These silicides vary from one to the other in their physical properties and construction. They vary in refractoriness and in resistance to oxidation at high temperature. But all are useful in certain applications.

A second method of powdered metal preparation in which powdered molybdenum disilicide, prepared as above described, is impregnated with other metals such as copper, nickel, cobalt, etc. or other alloys, such as "Colomonoy No. 6," Phosphor bronze, etc. In this method of preparation these additive metals and alloys are drawn into the skeleton of the molybdenum disilicide to form an intimate material. These alloys are not as refractory as the molybdenum disilicide alone, but they are useful for the reason that they can be readily worked by the process of "hot forming" i.e. "hot coining."

These disilicides may be considered as being inter-metallic compounds or metal compound phases. Broadly they are intermediate solid solutions some of which have wide and others narrow ranges of homogeneity. Since true intermetallic compounds have narrow ranges of homogeneity and simple stoichiometric proportions with atoms of identical kinds occupying identical points on the lattice, all of the disilides of this invention cannot be classed as true intermetallic compounds. They are all intermediate solid solutions and some of them, for example, $USi_2$, $WSi_2$, $TiSi_2$, $CrSi_2$, and $ZrSi_2$ may be of either type, particularly $ZrSi_2$ and $TiSi_2$ which apparently have wide range of homogeneity and can contain excessive silicon and/or excessive zirconium in solution with the disilicide.

But in the case of titanium disilicide, the theoretical analysis of which is:

| | |
|---|---|
| Titanium | 46.05 |
| Silicon | 53.95 |
| | 100.00 | the analyses of powdered silicides, prepared as above described gave the following:

| | I | II |
|---|---|---|
| Titanium | 49.0 | 44.10 |
| Silicon | 47.3 | 50.30 |
| Iron | | 1.04 |
| Aluminum | | .96 |
| Other Impurities | 3.7 | 3.60 |
| | 100.00 | 100.00 |

In neither case are the titanium and silicon present in the theoretical proportions. These compounds, however, showed good results at elevated temperatures and must be considered only as intermediate solid solutions.

Tungsten disilicide, as produced by the method of this inventor is a true intermetallic compound, checking very close to stoichiometric proportions. For some reason, not at present known, this compound although highly refractory, is not as resistant to oxidation as the other above listed disilicides. Its use is therefore limited to high temperature operations where oxidizing conditions are not too severe.

The use of these powdered disilicides is extensive. They may be used as a protective coating on other metal bases to inhibit oxidation of such bases at elevated temperatures, or they may be used as metallic powders either alone or alloyed with other metals or semi-metals to form articles of simple or relatively complicated shape by the methods of powder metallurgy.

As a protective coating on other metallic bases, molybdenum disilicide may preferably be applied in one of three ways:

(1) As a coating on molybdenum, silicon is applied as a coating on a piece of molybdenum, the coated piece is then heated to a temperature at which diffusion occurs, and the silicon diffuses into the molybdenum thereby forming a strong bond for the coating to the base metal.

(2) The application of a disilicide of one of the metals of the above defined group, for instance, molybdenum disilicide as a protective coating on the surface of a base material. The coating is applied by spraying the powdered silicide by means of a powdered metal spray gun in an atmosphere of helium, argon, nitrogen, or hydrogen under a pressure of from five to eight atmospheres and subsequently diffusing the disilicide into the base material in an inert gas atmosphere or vacuum.

(3) The disilicide is worked up in a carrier medium and applied as a brush coat on the surface of the base metal. The coated metal is then baked at a high temperature in an inert atmosphere or vacuum to diffuse the disilicide into the surface of the base metal thereby forming a strong bond for the disilicide coating.

The fabrication of the powdered disilicides of the group of metals above defined, and of molybdenum in particular, can be accomplished by a number of methods for example as follows:

(1) Cold pressing and sintering.
(2) Hot pressing.
(3) Vacuum casting.
(4) Hot coining.
(5) Swaging and rolling.

The formed material can be machined and brazed to the final required forms by methods such as:

(1) Grinding, diamond or gravity fed silicon carbide wheel.
(2) Machining, using carbide tools (only when in a partially sintered condition).
(3) Brazing, using silver, copper or colomonoy alloys.

PRODUCTION OF ARTICLES BY THE METHODS OF POWDER METALLURGY

As stated above, the production of articles by the methods of powder metallurgy can be accomplished by fine basic methods. The first of these, cold press and sinter, because of its extensive use industrially will be discussed first.

The cold press and sinter method

This method is now used commercially in the fabrication of cemented carbides. This method, with some modification, can be used for the making of articles from the powdered disilicides of this invention and particularly for the molding of powdered molybdenum disilicide.

In this process cold pressing is accomplished by the use of properly shaped permanent dies and applied pressure. The dies are oversized to allow for shrinkage during sintering. The pressure used varies with the shape of the work, the organic binder used, and the compacting necessary for good, green, mechanical strength. The pressure must be uniformly applied over the entire die in order to increase the resistance to possible later thermal shock. The pressures used vary between about ten and thirty tons per square inch. After the compacted piece is removed from the press it is sintered at a relatively high temperature about 2700° F.–3100° F. either in a vacuum or an inert atmosphere such as argon or helium. This inventor found that hydrogen, although widely used in commercial processes of sintering cemented carbides, cannot generally be used without some difficulties with pure molybdenum disilicide bodies; but that hydrogen could be used as a reducing atmosphere in the sintering step if small additions of binder metals, such as nickel and cobalt, were made to the powdered disilicide. The use of a hydrogen atmosphere is very desirable because of the relatively low cost and its commercial use.

The use of binder metals such as nickel and cobalt permits hydrogen sintering atmospheres and sintering temperatures up to about 2600° F. Above this temperature cracking occurs. The addition of iron or chromium as a binder metal lowers the sintering temperature to about 2430° F., above which temperature cracking occurs.

Particle size of the disilicide powder is important in the cold press and sinter method for the effect it has on the density and mechanical strength of the sintered body. While not, as yet, completely determined, test data indicate that a particle size of from one to about six microns is desirable.

The cold press and sinter method includes the conventional processes of extrusion and slip-casting. In the extrusion process a powder extrusion gun is used. The powder (the disilicide), after being mixed with organic binders, such as starch, glycerine, waxes, etc. is extruded through specific dies. The extruded parts are then slowly heated from low temperatures to maximum sintering temperatures. This process is particularly applicable in the fabrication of tubes. The slip-casting process may be used for making odd and complicated shapes and forms of these disilicides. A slurry is made with organic binders and cast into mold, after drying the shape is sintered slowly as in the extrusion process.

The hot press method

The disilicides of the metals above defined may also be molded and shaped in powdered form by the "hot press method." In particular molybdenum disilicide, which may be prepared with a purity of about 99.8%, may be molded by this method. For successful use in this method of pressing, the powder must be ground to a fine state of subdivision. This reduction in particle size is preferably accomplished by wet ball milling of the powder in an alcohol or acetone medium for control.

This inventor has found that if maximum high-temperature properties are desired, the particle size of the powdered disilicide for hot pressing and probably for the other methods herein described, should be as follows:

TABLE I

| Particle Size | Percent of Total |
|---|---|
| 0-6 microns | 90-100 |
| 6-25 microns | 0-10 |

Test data indicates that as regards to strength at least 90 percent of the particles must be less than 6 microns in diameter.

The powder upon removal from the ball mill must be completely dried and when necessary leached with dilute hydrochloric acid to remove metallic iron which may have been picked up during ball milling.

The powder is then pressed to the shape desired by the use of graphite form molds. The temperature used for hot pressing may vary between 2600° F. and 3100° F. Because of commercial limitations it is more practicable to use temperatures within the range of 2700° F. to 3000° F.

The pressure used for hot pressing may be varied generally from 500 to 7000 pounds per square inch depending upon the strength of the graphite dies and the temperature used for pressing. The relative brittleness of the disilicide, however, increases with increase in the applied pressure to the maximum allowable with the graphite dies. It is therefore more desirable to use pressures near the mean of the pressure limits for reasons of cost as well as less brittleness. The density of the disilicide also generally increases with the pressure and a pressure of from 1000 to 2000 pounds per square inch is required to obtain a density of over 5.0 grams per cubic centimeter when using fine powder (90% less than 6 microns).

Prolonged soaking at the temperature of hot pressing increases slightly the shock resistance or toughness of the disilicide at room temperature. Pressing and soaking at temperatures of 2900°-3200° F. have a greater effect on shock resistance or toughness of pieces than on samples pressed and soaked at lower pressing temperatures. Apparently the pressing temperature is the effective variable in the control of this physical characteristic.

The fractured disilicide, when hot pressed under the optimum conditions of temperature, pressure, particle size and particle size distribution, has a fine grained, silky, satiny luster similar to that obtained when hot-pressed cemented tungsten carbide is fractured.

The density of the hot pressed molybdenum disilicide may be varied over the range of from 5.00 to about 6.15 grams per cubic centimeter by variation in the following physical characteristics of the components and factors in the method of pressing:
 a. Particle size.
 b. Particle size distribution.
 c. Pressure.
 d. Temperature of hot pressing.

The density for maximum strength properties varied between 5.80 and 6.15 grams per cubic centimeter with 5.80 to 5.95 being the more desirable density figure. The high density limit may be attained by:
 a. A fine particle size with non-uniform particle size distribution.
 b. A greater hot press pressure and a higher hot press temperature or
 c. A combination of both.

The low limit of density may be attained by:
 a. A very uniform fine particle size (100 percent less than 6 microns in diameter with 90 percent less than 3 microns).
 b. A lower hot press pressure and a lower hot press temperature or
 c. A combination of both.

Reference to Table 2 shows that the density of the molybdenum disilicide can be varied by merely varying the particle size and the particle size distribution and that with a decrease in density due to an increase in fineness of particle size and a more uniform particle size distribution there is a drop in the ultimate breaking strength at the same temperature.

The above described hot-press procedures have been used for making various fabricated parts, such as flame-holder plates, turbine blades and bars.

*Vacuum casting*

It has not been possible to produce porosity-free bars of molybdenum disilicide by this method. Experimental tests, however, indicate that this disilicide can be cast in a positive pressure atmosphere of an inert gas, i.e. argon or helium.

It was found that zircon crucibles could be used satisfactorily for the melting and that in connection with porosity developed in bars cast in vacuo this leads to gas entrapment in the body of the casting; that hot press slugs also contain a considerable quantity of entrapped gas and that in powdered cold-press and vacuum sintered slugs the largest part of entrapped gas is eliminated.

In its present state of development the vacuum casting process is believed to be too costly for extensive use.

*Hot coining*

This method of fabrication is a finishing process which from an economical standpoint is highly advantageous. It is similar to hot pressing an already particularly sintered part. A part could therefore be cold-pressed and partly sintered to shape and then hot forged or hot coined to the final exact shape. This operation accomplishes densification, dimensional stability and eliminates or minimizes finish machining operations.

*Swaging and rolling*

These fabrication processes are also finishing operations. Material made into by the extrusion, cold-press and sinter or hot-press methods might be hot swaged or hot rolled above the brittle range of the ductile disilicide, viz. under the following physical conditions:
 a. Fineness—100 percent less than 6 microns in diameter, 90 percent less than 3 microns in diameter and at an
 b. Approximate temperature range—from 2600 to 3100° F. for rods, wire, or plates.

The following requirements for effective swaging and rolling have been experimentally determined:
 a. High purity of material is required, otherwise, the material is hot short and cracking occurs.
 b. Fine uniform particle size is required (100 percent less than 3 microns in diameter).
 c. Swaging temperature preferably should be in excess of 2800° F., but not greater than 3100° F.
 d. Percent reduction should be at a slow rate initially.

MECHANICAL PROPERTIES AT ROOM AND ELEVATED TEMPERATURES OF HOT-PRESSED MOLYBDENUM DISILICIDE

In the following table are given test data on the change in ultimate breaking strength from that at room temperature to that at 1800°, 2000°, 2200°, and 2400° F. on rods of molybdenum disilicide which were formed by the hot-press method and which varied in particle size and particle size distribution as indicated.

TABLE 2

| Particle Size (Microscopic Count) | Density, g./cc. | Purity, Percent | Test Temperature, of— | Ultimate breaking strength, p.s.i. | Total elongation, Percent in 3" |
|---|---|---|---|---|---|
| 100%<16 microns, 50%<5 microns | 5.93–94 | 99.8 | Room Temp | 19,130 | Not Detectable. |
| Do | 5.93–94 | 99.8 | 1,800° F | 18,500 | Do. |
| Do | 5.93–94 | 99.8 | 2,000° F | 20,000 | Do. |
| Do | 5.93–94 | 99.8 | 2,200° F | 21,000 | Do. |
| Do | 5.93–94 | 99.8 | 2,400° F | 21,500 | Do. |
| 90–95%<5 microns, 5–10%<25 microns | 5.90–5.92 | 99.0 | Room Temp | [1] >21,230 | Do. |
| Do | 5.90–5.92 | 99.0 | 2,000° F | 42,160 | Do. |
| Do | 5.90–5.92 | 99.0 | 2,200° F | 42,650 | Do. |
| Do | 5.90–5.92 | 99.0 | 2,400° F | [2] >34,900 | Do. |
| 98–99%<5 microns, 1–2%<6 microns | 5.87 | 99.0 | Room Temp | 29,600 | Do. |
| Do | 5.87 | 99.0 | 1,800° F | 40,050 | Do. |
| Do | 5.87 | 99.0 | 2,000° F | 41,800 | Do. |
| Do | 5.87 | 99.0 | 2,200° F | 37,000 | 0.1 percent. |
| Do | 5.87 | 99.0 | 2,400° F | 22,000 | 0.5 percent. |

[1] Broke in grip collet.
[2] Pulled through the high temperature grips.
NOTE.—The increase in elevated temperature tensile strength from the strength at room temperature is due to better alignment and fit of all grip material and specimen at the elevated temperatures. It could also be due to an increase in the disilicide ductility as the temperature increased (this ductility could be very little and not detectable by ordinary measuring methods). It is also possible that this increase is due to a diffusion process in the disilicide at elevated temperatures. Tests are now in progress to ascertain whether or not this is true.

The decrease in density with increase of uniformly distributed and decreased range in particle size is noted. The increase in ultimate breaking strength from that at room temperature to that at elevated temperatures is relatively great. This may be due to several causes of none of which is the inventor certain. This increase may be due to:

a. Better alignment and fit of all grip material and the specimen.
b. An increase in ductility of the disilicide.

In other words this table shows generally that:
As the particle size decreases,
a. The elevated temperature breaking strength increases.
b. The ductility increases.
c. The density decreases slightly.

As the particle size distribution becomes more uniform,
a. The elevated temperature breaking strength decreases at temperatures at and above 2200° F.
b. The ductility at elevated temperatures increases.
c. The density tends to decrease slightly for similar pressing conditions.

In general it may be concluded from the data in Table 2 that:
a. The ultimate breaking strength of the material remains approximately constant from room temperature to 2400° F. provided that the particle size and particle size distribution are as that shown in Table 1.
b. The ductility of the material increases at elevated temperatures provided that particle size and particle size distribution are as shown in line 1, Table 1.
c. The ultimate breaking strength of the material decreases above 2200° F. and the ductility increases provided the particle size is 100 percent less than 6 microns and uniform in distribution (90 percent to 95 percent less than 3 microns in diameter).

Ductility is an important characteristic in many applications and uses of this material. This is the property which decreases the "notch" sensitivity, relieves initial thermal stresses, and facilitates commercial handling. It must be noted, however, that increase in ductility is accompanied by a decrease in high temperature strength, and that ductility at room temperature cannot be detected.

THERMAL EXPANSION

Determination of the cumulative thermal expansion of triangular prisms of molybdenum disilicide was made through the temperature range of room temperature to 1500° C. followed by a reverse determination of from 1500° C. to room temperature. The particle size of the sample is as shown in Table 1. The density of the sample was 5.93 to 5.94 grams per cubic centimeter. The test results are given in Table 3.

TABLE 3.—LINEAR THERMAL EXPANSION—CUMULATIVE PERCENT

| During Heating | | During Cooling | |
|---|---|---|---|
| ° C. | Percent | ° C. | Percent |
| Room Temp | 0.00 | 1,500 | 1.35 |
| 100 | .04 | 1,400 | 1.21 |
| 200 | .12 | 1,300 | 1.09 |
| 300 | .20 | 1,200 | .97 |
| 400 | .29 | 1,100 | .86 |
| 500 | .38 | 1,000 | .75 |
| 600 | .47 | 900 | .65 |
| 700 | .56 | 800 | .56 |
| 800 | .65 | 700 | .46 |
| 900 | .74 | 600 | .38 |
| 1,000 | .85 | 500 | .29 |
| 1,100 | .95 | 400 | .20 |
| 1,200 | 1.06 | 300 | .12 |
| 1,300 | 1.16 | 200 | .05 |
| 1,400 | 1.26 | 100 | −.02 |
| 1,500 | 1.36 | Room Temp | −.08 |

It is noted that the material had a linear shrinkage of .08 percent upon cooling to room temperature. This is due to an additional sintering action occasioned by the heating to 1500° C.

AIR CORROSION PROPERTIES

This inventor has found that molybdenum disilicide is very resistant to corrosion, i.e. oxidation in air at elevated temperatures. Pieces of this disilicide of known area were held in a furnace, in an atmosphere of air, at temperatures of 2200° F., 2450° F., and 2850° F., for 100 hour, 200 hour, and 300 hour periods of time.

The pieces were then cooled and the gain or loss in weight was determined. The results are given in the following table:

TABLE 4.—AIR CORROSION DATA

| Temperature, °F. | Rate, gm./cm.² hr. | | |
|---|---|---|---|
| | 100 hours | 200 hours | 300 hours |
| 2,200 ¹ | 0.66×10⁻⁶ | 1.0×10⁻⁶ | 0.7×10⁻⁶ |
| 2,450 ¹ | 3.0×10⁻⁶ | 0.96×10⁻⁶ | 0.64×10⁻⁶ |
| 2,850 ² | 3.67×10⁻⁶ | ³ 3.1×10⁻⁶ | |

¹ Weight gain.
² Weight loss.
³ Time—135 hrs.

Examination of this table indicates that there is very little effect of air corrosion on the molybdenum disilicide at elevated temperatures. It is noted that at the lower temperatures (below 2500° F.) there is a weight gain, while after heating at the higher temperature there is a weight loss. This is due to the movement of a secondary impurity phase to the surface and the burning or volatilizing away of portions of this phase as it reaches the surface.

Electron diffraction photographs of the surface before and after heating has shown the presence of an amorphous phase on the surface after heating at 2850° F. This can be removed by slight polishing and the crystalline pattern of molybdenum disilicide surface returns. Metallographic analysis shows the loss of the secondary phase to the surface from the interior, which substantiates the electron diffraction and corrosion results.

The minute secondary phase thus accounts for the change in weight upon heating in the tests conducted. It is believed that by the elimination of this phase, the air corrosion resistance properties will be much better than that shown and that the physical properties will also be improved.

CHEMICAL CORRODIBILITY

At normal temperatures molybdenum disilicide is relatively inert or non-reactive to acid or basic re-agents. Table 5 shows the percentage loss in weight per hour of this disilicide in reaction at 70° F. with two concentrations of nitric acid, hydrofluoric acid, sulphuric acid, hydrochloric acid and sodium hydroxide.

TABLE 5.—CHEMICAL CORRODIBILITY OF MOLYBDENUM DISILICIDE AT 70° F.

[Percent change in weight per hour]

| Concentration | $HNO_3$ | HF | $H_2SO_4$ | HCl | NaOH |
|---|---|---|---|---|---|
| 10% | 0.0006 | 0.0034 | 0.0019 | 0.0005 | 0.0012 |
| Concentrated | 0.0004 | 0.010 | 0.0012 | 0.0005 | 0.0001 |

The almost negligible reaction of this disilicide with the ordinary re-agents is clearly shown in the above table.

WEAR RESISTANCE

The hardness of hot pressed molybdenum disilicide, Rockwell A-80-90, equals that of many of the present cemented carbides. Its resistance to wear, i.e. abrasion, is therefore believed to be of the same order as that of these carbides. Comparative data on this physical characteristic are not yet available. The combination of the resistance to abrasion of this material with its excellent physical strength and resistance to corrosion, all at elevated temperatures, opens up a rather extensive field of application in its use.

METALLIC ADDITIONS

The use of other metals to form homogeneous alloys or to form a "cementing" phase heterogeneous material is one of the most important problems relating to molybdenum disilicide.

The basic reason for these metallic additions is to increase the toughness or decrease the inherent brittleness of the intermetallic compound.

Preliminary tests showed that iron, nickel, cobalt, chromium, and platinum "wetted" the molybdenum disilicide, thereby indicating definite possibilities for good alloying toughening characteristics.

Oxidation tests indicated that for temperatures up to 2600° F. an alloying content up to 20 percent of cobalt was possible without too great a deterioration. The relative toughness comparison of 5, 10, and 20 percent additions of cobalt indicated that the 5 or 10 percent addition was better than that of the 20 percent. Also short time oxidation tests at 2800° F. showed that the addition of 5 to 10 percent of cobalt did not affect the resistance to oxidation properties appreciably.

Investigations were therefore conducted on the basis of using from 7 to 8 percent metallic additions of cobalt, nickel and platinum. The fine molybdenum disilicide powder was ball-milled in benzene and/or alcohol or acetone with these metallic additions for seventy two hours and dried. Bars of the material were hot pressed at temperatures above the melting points of the alloying metals. Difficulty was encountered with the cobalt addition and many of the bars containing this additive were cracked after the graphite die had cooled. The nickel and platinum bars did not crack and manufacturing conditions indicated that the nickel addition was best for handling. The 7.5 percent nickel bars were machined into tensile strength specimens and were tested at 2000° F. The results showed an ultimate strength of only 4,000 pounds per square inch, as compared to 40,000 pounds per square inch for the straight molybdenum silicide. The reason for this relatively large reduction in ultimate strength at 2000° F. is being investigated by metallographic and X-ray analysis.

The use of alloy additions for the cold press and sintering process was discussed supra. As a result of the above tests it was decided that the alloy addition should be reduced to the range of from 1 to 4 percent for maximum tensile strength. Thus in Table 6 is shown the variation in ultimate tensile breaking strength of molybdenum disilicide specimens each one containing additions of 3.3 percent by weight of iron, cobalt, nickel, and chromium, respectively. These specimens were cold pressed and sintered at the temperatures indicated, viz. 1250° C., 1300° C., 1350° C., 1400° C., and 1450° C. in an atmosphere of hydrogen and also at 1450° C. in vacuo.

It should be noted that, in general, the nickel addition gave the higher modulus of rupture values particularly for the specimens sintered at 1300° C. and 1350° C. Also it should be noted that with a relatively small addition of these alloying metals these results were obtained on specimens which had been sintered in an atmosphere of hydrogen. This makes commercially available various shapes and forms not otherwise available at reasonable cost.

Other elements were added for the express purpose of cleansing the disilicide particles of oxygen or other gases. These additions amounted to from 0.1 percent–2.0 percent and consisted generally of getter elements. Ex. titanium, zirconium, carbon, etc. These additions would tend to increase inter-particle cohesiveness, and thus an increase in the strength of the bodies was noted.

NON-METALLIC ADDITIONS (1)

The addition of small amounts of oxides, carbides, borides and other silicides on the order of from 0.1 percent to 35 percent additions to the disilicide bodies is practical. These additions are made to increase the elevated temperature properties of the disilicide bodies for specialized purposes.

TABLE 6.—METALLIC ADDITIONS—SINTERING EFFECT

| | 1,250° C. (H₂) | 1,300° C. (H₂) | 1,350° C. (H₂) | 1,400° C. (H₂) | 1,450° C. (H₂) | 1,450° C. (Vac.) |
|---|---|---|---|---|---|---|
| Iron: | | | | | | |
| Trans. Strength (p.s.i.) | | 24,500 | 44,500 | Cracked | Cracked | 48,400 |
| Hardness (R_A) | | Broke | Broke | | | Broke. |
| Shrinkage | | 8.5 | 13.5 | | | 16.5 |
| Density | | 4.91 | 5.31 | | | 5.16 |
| Cobalt: | | | | | | |
| Strength | | 29,300 | 31,800 | 43,000 | Cracked | 40,500 |
| Hardness | | Broke | 87 | 86 | | 85.8 |
| Shrinkage | | 6.6 | 11.9 | 15.2 | | 16.2 |
| Density | | 5.44 | 5.67 | 6.20 | | 6.42 |
| Nickel: | | | | | | |
| Strength | Low | 66,000 | 65,300 | 36,800 | Cracked | |
| Hardness | Low | 86.3 | 85 | 85.3 | | |
| Shrinkage | 9.3 | 16.1 | 13.7 | 12.9 | | |
| Density | 5.29 | 5.95 | 5.90 | 6.01 | | |
| Chromium: | | | | | | |
| Strength | | 24,800 | 41,800 | Cracked | Cracked | 38,000 |
| Hardness | | Broke | Broke | | | Broke. |
| Shrinkage | | 5.2 | 8.5 | | | 14.8 |
| Density | | | | | | 5.02 |

NON-METALLIC ADDITIONS (2)

The use of molybdenum disilicide as a binder metal for very high temperature applications (3000° F. to 5000° F.) with such compounds as beryllia, alumina, and the metal carbides is practical.

Tests were run using BeO (beryllia) and $A_2O_3$ (alumina). Samples containing up to 25 percent of molybdenum disilicide were hot pressed at a temperature above that of the disilicide. The compacts were then heated in air in an induction furnace to temperatures in excess of 3800° F. Little effect was noted on the samples and the use of this type of "ceramal" for very high temperature use looks promising.

Disclosure has been made of a preferred method of compounding the disilicides of certain metals of the fourth and sixth groups of the periodic table. The method disclosed does not involve the complete fusion of the base metal and the silicon as is done in the prior art. In this inventor's method the silicon upon reaction with the base metal enters the lattice structure thereof forming either a definite compound, an intermetallic compound or an intermediate solid solution therewith. Inasmuch as it is sometimes desirable to have a small excess of silicon present and at other times a small excess of the group element present, variations from the particular proportions given supra can be made without departing from the spirit or scope of the invention beyond that as defined by the herewith appended claims.

The invention described herein may be manufactured and used by or for the Government of the United States of America for governmental purposes without the payment of any royalties thereon or therefor.

This is a continuation of application Serial No. 177,548, filed August 3, 1950, now abandoned.

What is claimed is:

1. An article of manufacture comprising a sintered powder metallurgy product consisting essentially of sintered powder particles selected from the group consisting of the disilicides of uranium, molybdenum, chromium, tungsten, zirconium and titanium powdered substantially 100% to particle sizes substantially less than 25 microns.

2. An article of manufacture comprising a sintered powder metallurgy product consisting essentially of sintered powder particles selected from the group consisting of the disilicides of uranium, molybdenum, chromium, tungsten, zirconium and titanium powdered substantially 100% to particle sizes substantially less than 25 microns; at least 90% of said particles having a particle size less than 6 microns.

3. An article of manufacture comprising a sintered powder metallurgy product consisting essentially of sintered molybdenum disilicide powder particles powdered substantially 100% to a particle size less than 25 microns, said product having a density ranging from 5.00 to about 6.15 grams per cubic centimeter.

4. A process for forming a sintered powder metallurgy product consisting essentially of sintered powder particles selected from the group consisting of powder particles of the disilicides of uranium, molybdenum, chromium, tungsten, zirconium and titanium, said process comprising forming said disilicides in each instance by heating an intimate mixture of the elements thereof in powder form to a temperature initially less than the melting temperature of said elements and high enough to initiate reaction between said elements and allowing said reaction to proceed to substantial completion and produce a disilicide in a friable form and thereafter milling said friable disilicides to said powder particles to a degree reducing them to a particle size substantially 100% less than 25 microns; and forming said disilicide powder particles to the desired shape of said product and heating the resulting shape to sinter said disilicide powder particles.

5. A process for forming a sintered powder metallurgy product consisting essentially of sintered powder particles selected from the group consisting of powder particles of the disilicides of uranium, molybdenum, chromium, tungsten, zirconium and titanium, said process comprising forming said disilicides in each instance by heating an intimate mixture of the elements thereof in powder form to a temperature initially less than the melting temperature of said elements and high enough to initiate reaction between said elements and allowing said reaction to proceed to substantial completion and produce a disilicide in a friable form and thereafter milling said friable disilicides to said powder particles to a degree reducing them to a particle size substantially 100% less than 25 microns and at least 90% to a maximum particle size of 6 microns; and forming said disilicide powder particles to the desired shape of said product and heating the resulting shape to sinter said disilicide powder particles.

6. A process for forming an article of manufacture comprising a sintered powder metallurgy product consisting essentially of sintered powder particles selected from the group consisting of powder particles of the disilicides of uranium, molybdenum, chromium, tungsten, zirconium and titanium, said process comprising forming said disilicides in each instance by heating an intimate mixture of the elements thereof in powder form to a temperature initially less than the melting temperature of said elements and high enough to initiate reaction between said elements and allowing said reaction to proceed to substantial completion and produce a disilicide in a friable form and thereafter milling said friable disilicides to said powder particles to a degree reducing them to a particle size substantially 100% less than 25 microns; cold pressing said disilicide powder particles to form an unsintered piece having the desired shape of said product, and sintering said piece to form said product.

7. A process for forming an article of manufacture comprising a sintered powder metallurgy product consisting essentially of sintered powder particles selected from the group consisting of powder particles of the disilicides of uranium, molybdenum, chromium, tungsten, zirconium and titanium, said process comprising forming said disilicide in each instance by heating an intimate mixture of the elements thereof in powder form to a temperature initially less than the melting temperature of said elements and high enough to initiate reaction between said elements and allowing said reaction to proceed to substantial completion and produce a disilicide in a friable form and thereafter milling said friable disilicides to said powder particles to a degree reducing them to a particle size substantially 100% less than 25 microns; placing said disilicide powder particles in a mold and applying high pressure and heat to said particles in said mold so as to hot press and sinter said particles in said mold to form said product to the shape of said mold.

8. A process for forming a sintered powder metallurgy product consisting essentially of sintered powder particles of molybdenum disilicide, said process comprising forming said disilicide by heating an intimate mixture of the elements thereof in powder form to a temperature initially less than the melting temperature of said elements and high enough to initiate reaction between said elements and allowing said reaction to proceed to substantial completion and produce molybdenum disilicide in a friable form and thereafter milling said friable molybdenum disilicide to said powder particles to a degree reducing them to a particle size substantially 100% less than 25 microns, forming said milled particles into a preliminary shape, heating said shape to sinter said disilicide powder particles, thereafter heating said shape to temperatures ranging from about 2600 to 3100° F. and above the brittle temperature range of said sintered disilicide shape, and while said shape is thus heated hot working said shape to the final desired shape of said product.

References Cited in the file of this patent

UNITED STATES PATENTS

| | | |
|---|---|---|
| 1,560,885 | Walter | Nov. 10, 1925 |
| 2,089,030 | Kratky | Aug. 3, 1937 |
| 2,116,400 | Marth | May 3, 1938 |
| 2,193,413 | Wright | Mar. 12, 1940 |
| 2,665,474 | Beirdler | Jan. 12, 1954 |
| 2,779,580 | Steinitz | Jan. 29, 1957 |
| 2,921,861 | Wehrmann et al. | Jan. 19, 1960 |

FOREIGN PATENTS

| | | |
|---|---|---|
| 435,754 | Great Britain | Sept. 23, 1935 |